United States Patent [19]
Laukonis

[11] Patent Number: 5,975,962
[45] Date of Patent: Nov. 2, 1999

[54] NETWORK SHELF SYSTEM

[76] Inventor: Robert Laukonis, 13 Bedard Ave., Derry, N.H. 03038

[21] Appl. No.: 09/026,802

[22] Filed: Feb. 20, 1998

[51] Int. Cl.$^6$ ....................................................... H01R 9/22
[52] U.S. Cl. ............................................................ 439/713
[58] Field of Search ............................... 439/49, 713, 534

[56] References Cited

U.S. PATENT DOCUMENTS

| | | | |
|---|---|---|---|
| 2,572,617 | 10/1951 | Haury et al. | 175/298 |
| 4,863,388 | 9/1989 | Reimer et al. | 439/31 |
| 5,156,551 | 10/1992 | Unger et al. | 439/49 |
| 5,401,193 | 3/1995 | Lo Cicero et al. | 439/713 |
| 5,575,665 | 11/1996 | Shramawick et al. | 439/49 |

*Primary Examiner*—Neil Abrams
*Assistant Examiner*—J. F. Duverne
*Attorney, Agent, or Firm*—Kenneth E. Kozik

[57] ABSTRACT

A network shelf system is disclosed, which includes a network mounting shelf for mounting networking components and a rotatable swivel mounting assembly, for a patch panel. There is a support shelf disposed intermediate associated support brackets, which mount the network shelf system to a wall or like structure. The rotatable swivel mounting assembly is rotatably mounted to and extends between the support brackets. Also, disposed intermediate the support brackets and below the mounting shelf may be a patch panel, which is securely attached to the rotatable swivel mounting assembly at the patch panel's center line to allow the patch panel to be rotationally positioned between zero and one hundred and eighty degrees to provide access to punch down blocks, located on the posterior side of the patch panel, from either above or below the network shelf system or any position therebetween. There is also a "stand-alone" system having no attached shelf wherein the rotatable swivel mounting assembly may be attached to standard relay racks or may also be wall mounted. All embodiments of the invention allow a patch panel to be rotated in place, without requiring the patch panel to be moved to any other space, as is the case with conventional hinged mechanisms, in order to have work performed on both sides of the patch panel.

17 Claims, 6 Drawing Sheets

NETWORK SHELF SYSTEM

BACKGROUND OF THE INVENTION

This invention relates to network shelf systems, which are used to support networking equipment and to provide mounts for patch panels for interconnecting communication cables.

Telephone and data cables in a building, for example, interconnect telephone handsets and computer terminals located at desks and offices throughout the building with each other and with centralized communication facilities, including trunk lines, network servers, and PBX equipment. To permit flexibility in configuring and later changing the interconnections, cables are run from each telephone, computer, truckline, PBX, server, and other device, to a central interconnection "closet". The end of each wire of a cable is connected to terminals in a punch down block, which is commonly part of a patch panel. The terminals of the punch down block are in turn tied to accessible modular connectors. The final interconnection of cables is then achieved by short cables run between selected pairs of the connectors. To reconfigure the interconnection scheme, the user simply disconnects and reconnects the short cables to other pairs of the connectors.

Setting up an interconnection closet is a labor intensive activity. Typically, there are a large number of patch panels. The many hundreds of wires in the cables routed to the closet must be individually punched down into the blocks. Then, the patch panels must be individually mounted on a rack or in a cabinet often using screws.

Occasionally a new cable is run into the closet and must be punched down to one of the blocks. This requires that the installer have access to the back of the blocks where the punching down is done.

Various wall mounted patch panel devices have been configured to attempt to allow an installer to have ready access to the back of their punch down blocks. These configurations typically include hinges, which allow the patch panel to swing left to right or top to bottom to give access to the back of the panel. Both of these arrangements require careful cable management to prevent excessive stresses on the attached wires. Also, since punching down typically requires an installer to apply substantial forces in order to punch down a wire or cable, many patch panels are, or must be, configured to be removed from a rack or a wall to another location (e.g., a table), which is able to support the panel against the forces exerted during punching down. An alternate arrangement, which is taught in U.S. Pat. No. 5,401,193 (Lo Cicero et al.), is a Patch Panel System, which includes a support shelf against which a hinged patch panel is supported to allow an installer to readily apply the necessary forces to punch down a connection. However, a significant drawback of the Lo Cicero Patch Panel System is that it requires an installer to be physically located at an elevation above the patch panel system in order to apply forces against the support shelf when punching down connections. Thus, the Lo Cicero Patch Panel System can only be used in relatively low locations. Accordingly, a drawback of Lo Cicero and other patch panel systems is that they cannot be stacked up to the ceiling level and still be readily accessible by an installer.

SUMMARY OF THE INVENTION

A first embodiment of the invention is a network shelf system comprising a mounting shelf located between and connected to first and second support brackets, and a rotatable swivel mounting assembly for a patch panel. The patch panel has two ends, and the rotatable swivel mounting assembly supports both ends of the patch panel, such that the patch panel is fixedly attached to the rotatable swivel mounting assembly about a substantially central horizontal pivot axis at the midpoint of the ends of the patch panel. The rotatable swivel mounting assembly is rotatably attached to the first and second support brackets. The rotatable swivel mounting assembly allows the patch panel to rotate in place, and enables the user to access both sides of the patch panel without requiring any additional space as is required with hinged mechanisms. The rotatable swivel mounting assembly further includes at least one swivel locking mechanism which locks the rotatable swivel mounting assembly in a fixed position. The at least one swivel locking mechanism is unlockable such that the rotatable swivel mounting assembly is rotatable about the pivot axis of the patch panel for alternately exposing a patch side and a punch down side of the patch panel.

The first and second support brackets may further include power strip mounting holes for attaching power strips to the network shelf assembly. The first and second support brackets may also include strap slots and cable fasteners for maintaining the tidiness of the network shelf system. The first and second support brackets further include mounting holes which allow the network shelf system to be removably attached to a wall by fasteners. The mounting holes may be keyhole mounting holes which allow the network shelf system to be removed from the wall to which it is mounted without the necessity of removing the fasteners from the wall.

The mounting shelf of the network shelf system is of a dimension such that when the network shelf system is attached to a wall, the mounting shelf does not meet the wall such that cables and wiring are extendable through the space created between the mounting shelf and the wall.

In the network shelf system of the present invention, the rotatable swivel mounting assembly may further include an adjustable rear cable management bar having two ends which two ends are adjustably mountable in mounting slots formed in the rotatable swivel mounting assembly. The rotatable swivel mounting assembly also has patch panel mounting apertures formed in the rotatable swivel mounting assembly opposite the mounting slots such that the rear cable management bar runs parallel to the patch panel and wiring attached to the patch panel is attachable to the rear cable management bar to maintain tidiness and alleviate stress on wiring connections attached to the patch panel.

Another embodiment of the present invention is a "stand—alone" rotatable swivel mounting assembly which may be attached to a wall or used with shelving and relay rack assemblies. This embodiment contains a first support bracket and a second support bracket, a first rotatable swivel mounting rotatably attached to an inner surface of the first support bracket, and a second rotatable swivel mounting rotatably attached to an inner surface of the second support bracket. There may be a mounting slot formed along one side of each of the first and second rotatable swivel mountings, and a plurality of patch panel mounting apertures formed along a side of each first and second rotatable swivel mounting opposite the mounting slot so that a patch panel is securely attachable connected between the first and second rotatable swivel mountings.

At least one swivel locking mechanism may extend through the first and/or second support bracket to the first or second rotatable swivel mounting such that when the at least one swivel locking mechanism is locked the first and second rotatable swivel mountings are held in a fixed position and when the at least one swivel locking mechanism is unlocked, the first and second rotatable swivel mountings are freely rotatable, However, in practice the rotatable swivel mounting assembly preferably would only be rotated 180 degrees in a direction towards a user and 180 degrees back to its original position. The at least one swivel locking mechanism may extend through each first and/or second support bracket to engage each first or second rotatable mounting when the at least one swivel locking mechanism is in a locked position, thereby preventing rotation of the rotatable swivel mounting assembly. An adjustable rear cable management bar may be adjustably attachable to the first and second rotatable swivel mountings and extends between the first and second rotatable swivel mountings. The adjustable rear cable management bar is adjustably attachable in the mounting slots, and allows wiring to be neatly attached to the adjustable rear cable management bar to maintain order of the wiring and to alleviate stress on the connections to the patch panel when the rotatable swivel mounting assembly is rotated for adjustment, addition or removal of wiring.

Accordingly, one aspect of the invention is to provide a network shelf system, which can be installed in any elevation along a wall and still allow ready access to the back of its punch down block for network hardware installation.

Another aspect of the invention is to provide a network shelf system, which not only provides an easily mountable rotatable swivel mounting assembly for a patch panel that supports both ends of the patch panel for secure punch down and improved wire management, but allows the network to remain in operation during moves, additions or changes.

Yet another aspect of the invention is to provide a network shelf system, which includes a support shelf to hold network equipment, such as hubs, modems and power strips, etc., which would eliminate the necessity of utilizing rackmounts to house such network components.

Still another aspect of the invention is to provide a "stand-alone" easily mountable rotatable swivel mounting assembly which has no attached shelf and which is attachable to standard relay racks or to a wall or other mounting.

A still further aspect of the invention is to provide the rotatable swivel mounting assembly with an adjustable rear cable management bar for neatness and for alleviating stress on the wiring connected to the patch panel.

These and other aspects of the invention are accomplished using a network shelf system, which again briefly comprises a support shelf disposed intermediate associated support brackets, which mount the shelf system to a wall or like structure. Also, disposed intermediate the support brackets and below the mounting shelf may be a patch panel, which is attachable to the rotatable swivel mounting assembly at the patch panel's center line to allow the patch panel to be rotationally positioned between zero and one hundred and eighty degrees to provide access to punch down blocks located on the posterior side of the patch panel from either above or below the network shelf system or any position therebetween. There is also a "stand-alone" network system wherein the rotatable swivel mounting assembly may be attached to standard relay racks or other like equipment, or which may be wall mounted.

DETAILED DESCIPTION OF THE INVENTION

Figure 1:
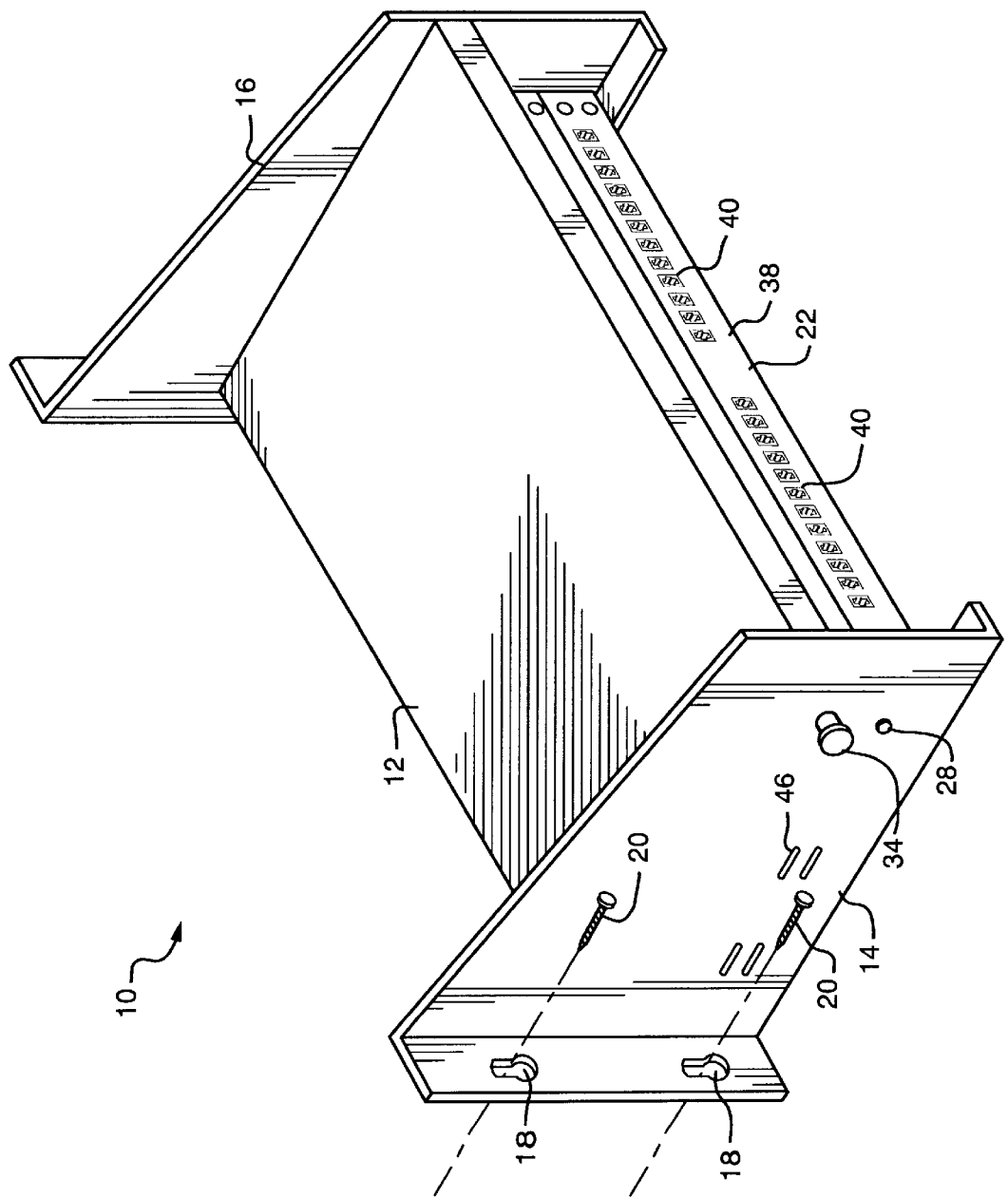
FIG. 1 is a perspective view of the disclosed network shelf system.
Figure 2:
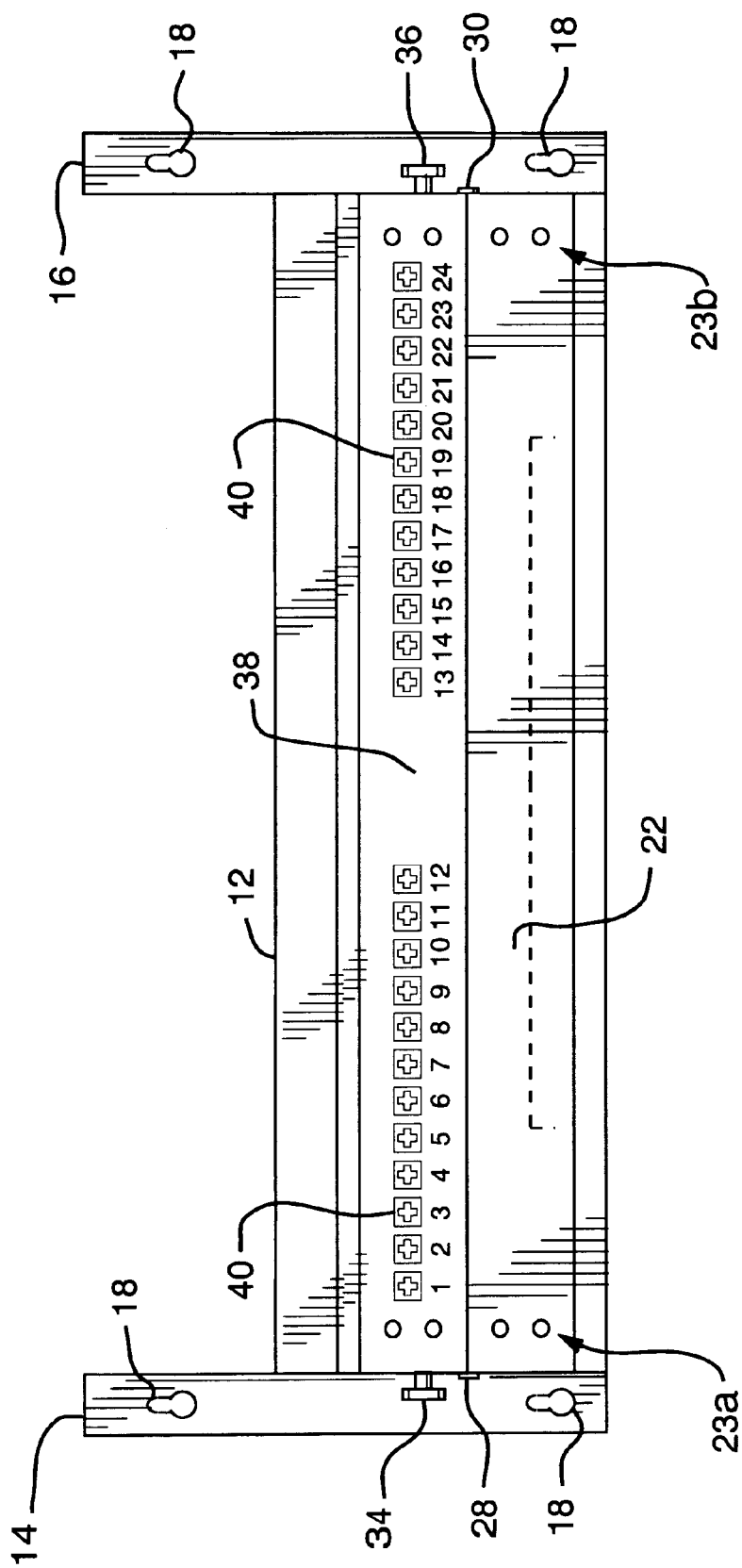
FIG. 2 is a front view of the network shelf system of FIG. 1.
Figure 3:
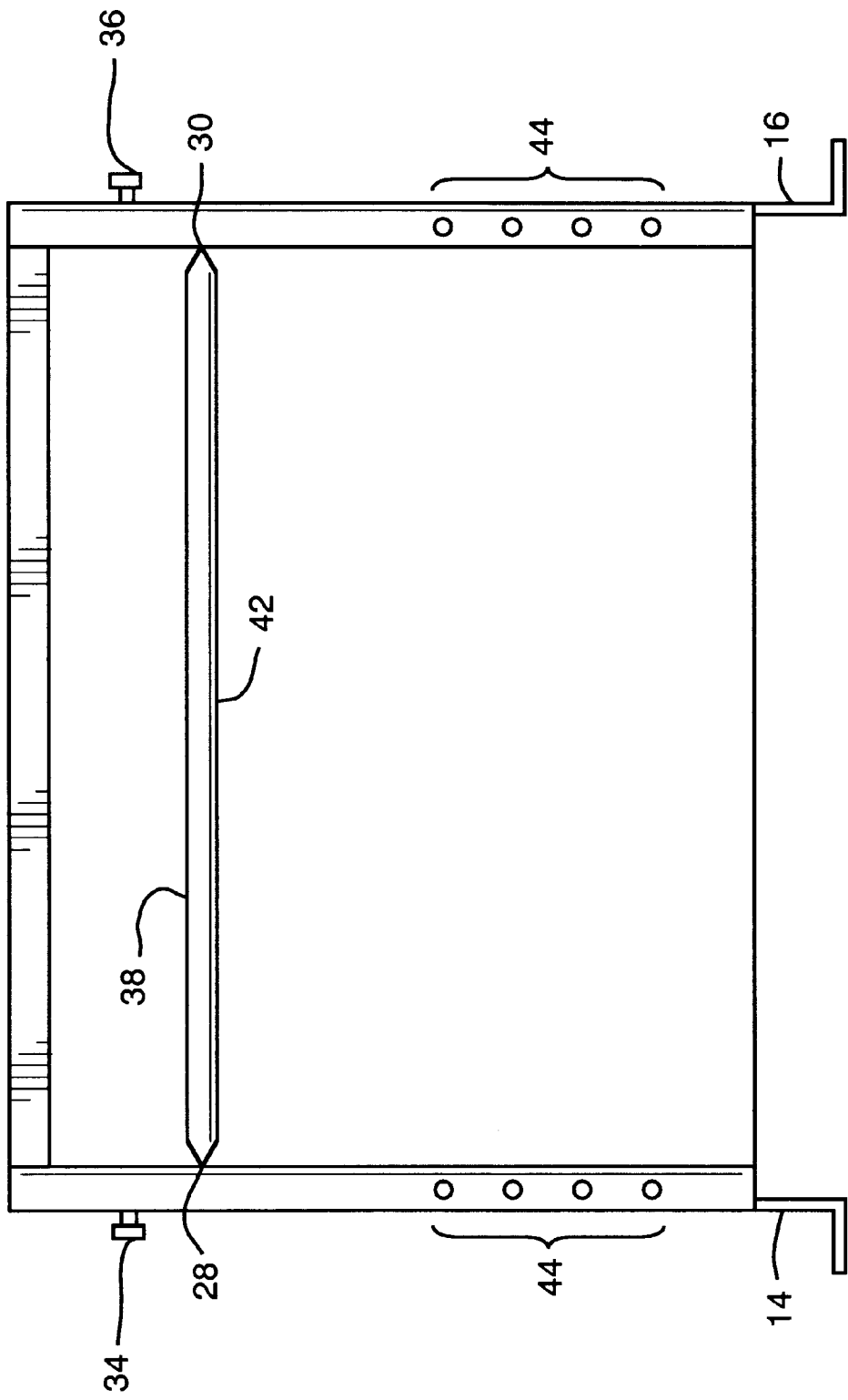
FIG. 3 is a bottom view of the network shelf system of FIG. 1.
Figure 4:
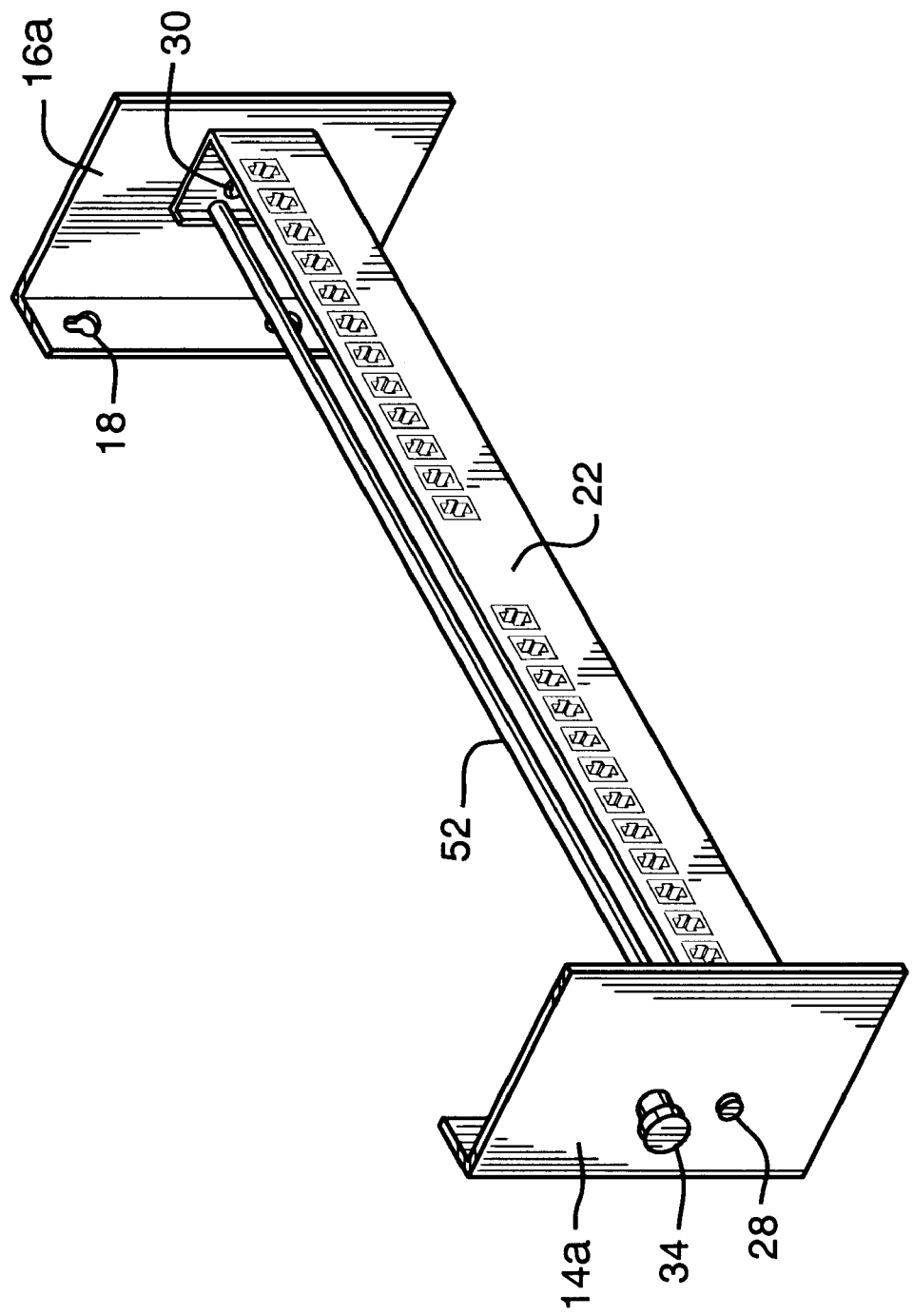
FIG. 4 is a perspective view of an embodiment of the "stand—alone" rotatable swivel mounting assembly.

Referring now to the figures, in one embodiment, as shown in FIGS. 1, 2, and 3, the network shelf system 10 comprises network component shelf 12, upon which networking components or like equipment (not shown) are mounted. At either end of network component shelf 12, and which may be integrally formed with shelf 12, are first and second support brackets 14 and 16.

The network shelf system can be mounted to a wall or other like structure through mounting holes 18. In the preferred embodiment, mounting holes 18 are configured as keyhole mounting holes, which allow the network shelf system to be removably attached to a wall or other like structure without the necessity of completely removing the fasteners 20 from the wall.

Figure 5A:
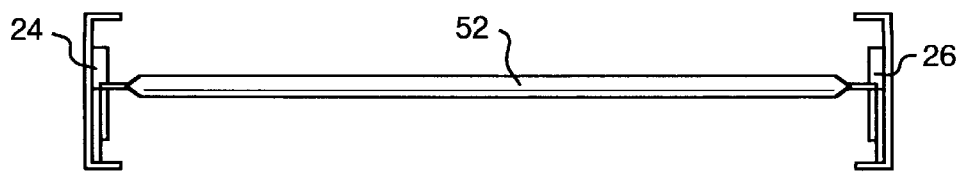
FIG. 5a is a top plan view of the "stand—alone" rotatable swivel mounting assembly.
Figure 5B:
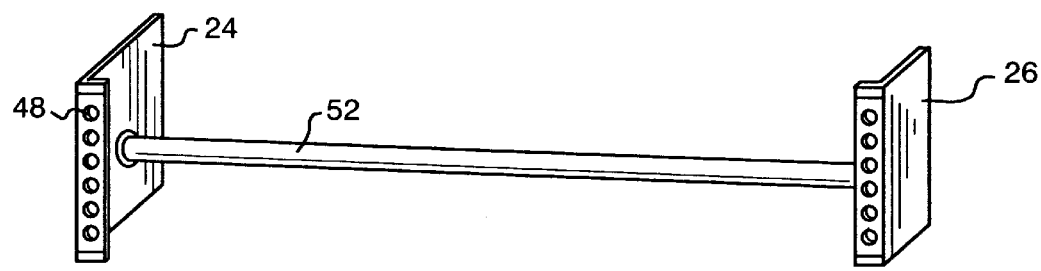
FIG. 5b is a front view of the "stand—alone" rotatable swivel mounting assembly.
Figure 5C:
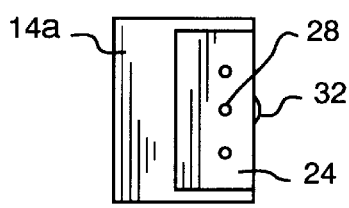
FIGS. 5c and 5d are left and right side views respectively showing a particular embodiment of how the first and second rotatable swivel mountings are mounted to the support brackets.
Figure 5D:
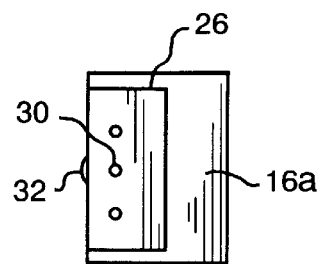

Disposed intermediate first and second support brackets 14 and 16 is patch panel 22. Patch panel 22 is fixedly and securely attached at patch panel end 23a and patch panel end 23b to a rotatable swivel mounting assembly by first and second rotatable swivel mountings 24 and 26 shown in FIGS. 5c and 5d. Patch panel 22 is connected substantially along a horizontal pivot axis along the center line of patch panel 22. As best shown in FIG. 1 overall and FIGS. 5c and 5d in detail, rotatable swivel mountings 24 and 26 are rotatably attached to support brackets 14 and 16 by fasteners 28 and 30 which, in a preferred embodiment may be a rivet and a lock nut, or a pin with a c-clip or any suitable fastening mechanism. A spacing washer 32 is preferably disposed between support brackets 14 End 16 and rotatable swivel mountings 24 and 26.

Figure 6B:
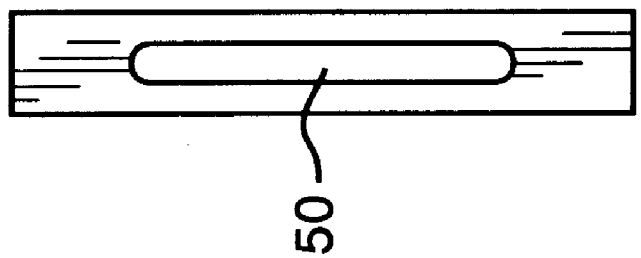
FIG. 6b is a back view of the rotatable swivel mounting assembly showing the mounting slot for attachment of the adjustable rear cable management bar.
Figure 6A:
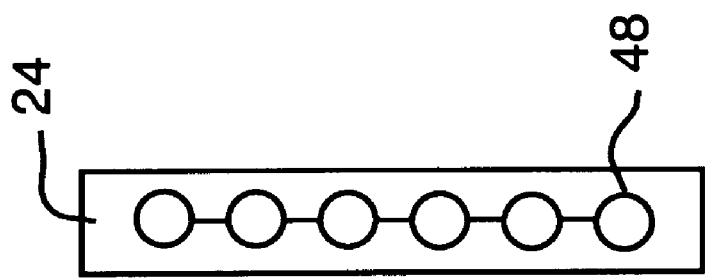
FIG. 6a is a front view of the rotatable swivel mounting assembly showing the plurality of patch panel mounting apertures.

As most easily shown in FIGS. 5a–5d and 6a, there are preferably patch panel mounting apertures 48 formed in rotatable swivel mountings 24 and 26, for attaching patch panel 22. Also formed on rotatable swivel mountings 24 and 26 may be a mounting slot 50, shown in FIG. 6b wherein the ends of an adjustable rear cable management bar 52 shown in FIG. 5b, may be attached. The positioning of bar 52 may be adjusted along the mounting slot 50, and bar 52 is preferably secured in place by a fastener inserted through an eyelet (not shown) formed in each end of the bar 52, the fastener then inserted through slot 50 and secured in place. Such a fastener may be a nut and bolt or similar fastening system (not shown). The orientation of patch panel mounting apertures 48 and mounting slot 50 on rotatable swivel mountings 24 and 26 is such that they are located on opposite sides of mountings 24 and 26 so that patch panel 22 and adjustable rear cable management bar 52 are substantially parallel when installed. Thus when looking at the network shelf system from the front, a user sees the patch side 38 of patch panel 22 (for exposing patching connectors 40), and adjustable rear cable management bar 52 is behind patch panel 22 so that wiring attached to patch panel 22 on its punch down side 42 (for exposing punch down terminals associated with connectors 40) may be run along and attached to bar 52 in order to alleviate stress on the punched down connections when patch panel 22 is rotated and to maintain order and neatness of the wiring.

When patch panel 22 is in its front-facing, vertical operational position, patch panel 22 is locked in position, as shown in this particular embodiment, by swivel locking mechanisms 34 and 36. Swivel locking mechanisms 34 and 36 may be any type of engageable and disengageable locking mechanism which will secure the rotatable swivel mounting assembly in a fixed position when locked. Swivel locking mechanisms 34 and 36 may be spring operated locking mechanisms, or any suitable locking mechanism, even a bolt and nut, but preferably a mechanism that can be operated with one hand. Preferably there is at least one swivel locking mechanism engaging the rotatable swivel mounting assembly. In the particular embodiments shown in the drawing figures, locking mechanisms 34 and 36 have a spring mechanism which extends through support brackets 14 and 16, and which operates a pin such that when the external knob of the swivel locking mechanisms 34 and 36 is pulled out and turned, the pin may be withdrawn and fixed in position thereby creating the unlocked state. Turning the knob in the opposite direction frees the pin to be spring-released to engage holes in the rotatable swivel mountings 24 and 26 to lock the mountings 24 and 26 in a fixed position.

In order for an installer to access the punch down terminals, the installer simply unlocks the swivel locking mechanisms 34 and 36 (or there may be only one locking mechanism although a particular embodiment is shown here with two locking mechanisms) and rotates the patch panel 22 about its central, horizontal axis towards the user so that he or she has access to the punch down side 42 of the patch panel 22. Once the punch down terminals are accessible, the installer then "punches down" the telephone, computer or other cable to the punch down terminals. Since a substantial amount of force is required in order to "punch down" a cable, an advantage of the present invention is that, the installer may use one hand to punch down the cable without using his or her other hand to provide support against which the force required to punch down the cable can be applied, due to the combined strength of the fasteners 28 and 30, the swivel locking mechanisms 34 and 36, and the rotatable swivel mountings 24 and 26. Once the connection is made on the punch down terminals, the installer simply rotates patch panel 22 back to its operational position, where the patching connectors 40 are front-facing and locks patch panel 22 in position.

Once a cable connection is made and the patch panel is in its operational position, an installer can patch a connection between patching connectors or between a patching connector and a desired piece of network equipment or the like.

In a preferred embodiment, the network or other equipment would be mounted on the mounting shelf 12 directly above the patch panel being utilized. Multiple network shelf systems can be installed proximate each other and their various patch panels can be interconnected amongst the different network equipment supported thereon. A particular advantage of the present invention is that network mounting shelf 12 is of a size such that it does not extend the full depth of mounting brackets 14 and 16, as can be seen in FIG. 1, so that shelf 12 does not meet the wall when the network shelf system 10 is installed on a wall. There is a space created between the back end of shelf 12 and the wall wherein cables and wiring may be run cleanly along the wall and from shelf to shelf if multiple network shelf systems are mounted in a vertical arrangement. Preferably there will be about a 1 ½ inch gap between the end of shelf 12 and the wall.

The first and second support brackets 14 and 16 may also include mounting holes 44 located on the undersides thereof, and shown in FIG. 3, which can be utilized to mount power strips to the shelf 12, which can then be connected to the various types of equipment supported on the shelf in order to provide power to the equipment. The support brackets 14 and 16 may also include a series of strap slots 46, which can be used in conjunction with cable fasteners, such as wire ties or VELCRO® straps, in order to restrain cables or the like in order to maintain the tidiness of network or other cables, which are located underneath the shelf 12.

In another embodiment of the present invention, the support brackets and rotatable swivel mountings may be used in a "stand—alone" configuration for mounting onto standard relay racks and the like, or for wall mounting without an integral shelf. FIGS. 4 and 5a–d illustrate this particular embodiment which comprises first and second support brackets 14a and 16a which are smaller in dimension than brackets 14 and 16 and wherein there is no shelf between or integrally attached to the brackets. Support brackets 14a and 16a are attachable to a standard relay rack assembly or may be mounted to a wall. A patch panel 22 is preferably attachable to and between first and second rotatable swivel mountings 24 and 26 by fasteners inserted through patch panel mounting apertures 48 formed in rotatable swivel mountings 24 and 26. Shown in this particular embodiment, swivel locking mechanisms 34 and 36 extend through support brackets 14a and 16a and maintain patch panel 22 in either a fixed or rotatable orientation. Again, also formed on rotatable swivel mountings 24 and 26 may be a slot 50 wherein the ends of an adjustable rear cable management bar 52 may be attached. The positioning of bar 52 may be adjusted along the slot 50, and bar 52 is preferably secured in place by a fastener inserted through an eyelet formed in each end of the bar 52, the fastener then inserted through slot 50 and secured in place. The fastener may be a nut and bolt or similar fastening system.

Thus, the present invention may be a "complete" integrated assembly with a shelf included or a "stand—alone" assembly for use with relay racks or other like systems or for wall mounting, and is thus versatile, convenient, easily installed or removed, easy to work on, and presents an extremely neat appearance while maintaining wires in an orderly manner.

Although the present invention has been described with the above-identified preferred embodiments, workers skilled in the art will recognize that changes may be made in form and detail of structure and operation without departing from the spirit and scope of the invention.

Accordingly, what is claimed is:

1. A network shelf system comprising:
   a mounting shelf disposed intermediate first and second support brackets,
   a 360 degree stepped rotatable swivel mounting assembly for a patch panel, the patch panel having two ends,
   wherein said 360 degree stepped rotatable swivel mounting assembly supports both ends of the patch panel, and wherein the patch panel is fixedly attached to said 360 degree stepped rotatable swivel mounting assembly about a substantially central horizontal pivot axis at the midpoint of the ends of the patch panel, and wherein said 360 degree stepped rotatable swivel mounting assembly is rotatably attached to said first and second support brackets.

2. The network shelf system according to claim 1 further comprising at least one swivel locking means which locks said 360 degree stepped rotatable swivel mounting assembly in a fixed position wherein said at least one swivel locking means, when locked, engages said 360 degree stepped rotatable swivel mounting assembly thereby securing said 360 degree stepped rotatable swivel mounting assembly in said fixed position, and wherein said at least one swivel locking means is unlockable such that when unlocked said 360 degree stepped rotatable swivel mounting assembly is rotatable about the pivot axis of the patch panel for alternately exposing a patch side and a punch down side of the patch panel.

3. The network shelf system according to claim 1 wherein said 360 degree stepped rotatable swivel mounting assembly further comprises a first 360 degree stepped rotatable swivel mounting rotatably attached to an inner surface of said first support bracket;

a second 360 degree stepped rotatable swivel mounting rotatably attached to an inner surface of said second support bracket.

4. The network shelf system according to claim 3 wherein said 360 degree stepped rotatable swivel mounting assembly further comprises a mounting slot formed in each said first and second 360 degree stepped rotatable swivel mountings.

5. The network shelf system according to claim 4 wherein said 360 degree stepped rotatable swivel mounting assembly further comprises an adjustable rear cable management bar having two ends wherein said two ends of said adjustable rear cable management bar are adjustably mountable in said mounting slot on each said first and said second 360 degree stepped rotatable swivel mountings.

6. The network shelf system according to claim 5 wherein said 360 degree stepped rotatable swivel mounting assembly further comprises patch panel mounting apertures formed in said first and said second 360 degree stepped rotatable swivel mountings such that, when attached, the patch panel is disposed parallel to said adjustable rear cable management bar wherein wiring attached to the patch panel is attachable to said rear cable management bar to maintain tidiness and alleviate stress on wiring connections to the patch panel.

7. The network shelf system according to claim 1 wherein said first and second support brackets further include power strip mounting holes.

8. The network shelf system according to claim 1 wherein said first and second support brackets further include strap slots and cable fasteners for maintaining the tidiness of the network shelf system.

9. The network shelf system according to claim 1 wherein said first and second support brackets further comprise mounting holes which allow the network shelf system to be removably attached to a wall by fasteners.

10. The network shelf system according to claim 9 wherein said mounting holes are keyhole mounting holes which allow the network shelf system to be removed from the wall to which it is mounted without the necessity of removing the fasteners from the wall.

11. The network shelf system according to claim 1 wherein said mounting shelf is of a dimension such that when the network shelf system is attached to a wall, said mounting shelf does not meet the wall such that cables and wiring are extendable through the gap created between said mounting shelf and the wall.

12. A 360 degree stepped rotatable swivel mounting assembly comprising:

a first support bracket and a second support bracket;

a first 360 degree stepped rotatable swivel mounting rotatably attached to an inner surface of said first support bracket, a second 360 degree stepped rotatable swivel mounting rotatably attached to an inner surface of said second support bracket, and a plurality of patch panel mounting apertures formed along a side of each said first and said second 360 degree stepped rotatable swivel mountings wherein a patch panel is securely attachable between said first and said second 360 degree stepped rotatable swivel mountings.

13. The 360 degree stepped rotatable swivel mounting assembly according to claim 12 further comprising a mounting slot formed along one side of each said first and said second 360 degree stepped rotatable swivel mountings.

14. The 360 degree stepped rotatable swivel mounting assembly according to claim 13 wherein an adjustable rear cable management bar is adjustably attachable to said first and said second 360 degree stepped rotatable swivel mountings and said adjustable rear cable management bar extends between said first and said second 360 degree stepped rotatable swivel mountings.

15. The 360 degree stepped rotatable swivel mounting assembly according to claim 14 wherein said adjustable rear cable management bar is adjustably attachable to said first and said second 360 degree stepped rotatable swivel mountings in said mounting slot on each said first and said second 360 degree stepped rotatable swivel mounting.

16. The 360 degree stepped rotatable swivel mounting assembly according to claim 13 wherein said patch panel mounting apertures and said mounting slot are oriented on said first and said second 360 degree stepped rotatable swivel mountings such that the patch panel and said adjustable rear cable management bar are substantially parallel when installed on said first and said second 360 degree stepped rotatable swivel mountings.

17. The 360 degree stepped rotatable swivel mounting assembly according to claim 12 further comprising at least one swivel locking means which locks said first and said second 360 degree stepped rotatable swivel mountings in a fixed position, such that when said at least one swivel locking means is locked said first and said second 360 degree stepped rotatable swivel mountings are held in a fixed position and when said at least one swivel locking means is unlocked said first and said second 360 degree stepped rotatable swivel mountings are freely rotatable.

* * * * *